United States Patent
Gounelle

(10) Patent No.: US 10,863,155 B2
(45) Date of Patent: Dec. 8, 2020

(54) REDUCTION OF BANDING ARTIFACTS IN IMAGE PROCESSING

(71) Applicant: GoPro, Inc., San Mateo, CA (US)

(72) Inventor: Romain Gounelle, Haut de Seine (FR)

(73) Assignee: GoPro, Inc., San Mateo, CA (US)

( * ) Notice: Subject to any disclaimer, the term of this patent is extended or adjusted under 35 U.S.C. 154(b) by 60 days.

(21) Appl. No.: 16/231,772

(22) Filed: Dec. 24, 2018

(65) Prior Publication Data

US 2020/0204772 A1 Jun. 25, 2020

(51) Int. Cl.
| | | |
|---|---|---|
| *G06T 5/00* | (2006.01) | |
| *H04N 9/64* | (2006.01) | |
| *H04N 9/68* | (2006.01) | |
| *H04N 5/20* | (2006.01) | |
| *H04N 5/225* | (2006.01) | |
| *H04N 5/232* | (2006.01) | |
| *H04N 5/243* | (2006.01) | |

(52) U.S. Cl.
CPC .............. *H04N 9/646* (2013.01); *H04N 5/20* (2013.01); *H04N 5/2254* (2013.01); *H04N 5/23216* (2013.01); *H04N 5/232933* (2018.08); *H04N 5/243* (2013.01); *H04N 9/68* (2013.01)

(58) Field of Classification Search
CPC . G06T 5/002; G06T 5/50; G06T 2207/10016; G06K 9/40; H04N 5/21–5/2178
See application file for complete search history.

(56) References Cited

U.S. PATENT DOCUMENTS

| | | | |
|---|---|---|---|
| 7,164,439 B2 | 1/2007 | Yoshida | |
| 2013/0242143 A1 | 9/2013 | Chen | |
| 2014/0078358 A1* | 3/2014 | Takenaka | H04N 5/2353 348/294 |
| 2014/0240563 A1* | 8/2014 | Nakaseko | H04N 5/365 348/296 |
| 2016/0119756 A1 | 4/2016 | Ryan | |
| 2016/0316128 A1 | 10/2016 | Teich | |

(Continued)

FOREIGN PATENT DOCUMENTS

EP   1071042 A2   1/2001

OTHER PUBLICATIONS

Image procesing, Horizontal banding (flickering) due to electronic rolling shutters, Signal processing stack exchange, https://dsp.stackexchange.com/questions/19853/horizontal-banding-flickering-due-to-electronic-rolling-shutters, 5 pages.

(Continued)

*Primary Examiner* — Brian Werner
(74) *Attorney, Agent, or Firm* — Young Basile Hanlon & MacFarlane, P.C.

(57) ABSTRACT

An image capture device may detect and repair banding artifacts in a video. The image capture device may include an image sensor and an image processor. The image sensor may capture a frame that includes a sinusoidal light waveform banding artifact. The image processor may detect a sinusoidal light waveform in the frame. The image processor may perform a sinusoidal regression. The image processor may obtain an inverted gain map. The image processor may apply the inverted gain map to the frame. The image processor may output the frame.

20 Claims, 10 Drawing Sheets

(56) References Cited

U.S. PATENT DOCUMENTS

2019/0166345 A1* 5/2019 Katayama ................ H04N 9/64

OTHER PUBLICATIONS

Flicker-free Video Tutorial, https://www.red.com/red-101/flicker-free-video-tutorial, 5 pages.
How do I beat the flickering caused by a light when recording a video?, https://www.quora.com/How-do-I-beat-the-flickering-caused-by-a-light-when-recording-a-video, 4 pages.
International Search Report and Written Opinion issued in PCT/US2019/066481, dated Mar. 26, 2020, 6 pages.

* cited by examiner

REDUCTION OF BANDING ARTIFACTS IN IMAGE PROCESSING

TECHNICAL FIELD

This disclosure relates to the reduction of banding artifacts in image processing.

BACKGROUND

Alternating current (AC) power lines are known to generate a sinusoidal waveform. This sinusoidal waveform typically oscillates at 50 Hz or 60 Hz depending on the region in the world. The oscillation of the sinusoidal waveform creates a pulsating light that humans cannot perceive as the oscillation is too high for a human eye to detect. An image sensor, however, can detect the pulsating light because of the rolling shutter technology used in the image sensor. The pulsating light typically appears as a flickering artifact in high-speed video.

SUMMARY

Disclosed herein are implementations of detecting and repairing banding artifacts in a video. An aspect may include a method for detecting and repairing banding artifacts may include detecting a sinusoidal light waveform in a frame. The frame may be an image frame, for example a video frame. The frame may include a banding artifact. The method may include obtaining a gain map. The gain map may be based on the detected sinusoidal light waveform. The method may include obtaining an inverted gain map. The inverted gain map may be based on the gain map. The method may include applying the inverted gain map to the frame to repair the banding artifact to obtain a repaired frame. The method may include outputting the repaired frame.

An aspect may include an image capture device configured to detect and repair banding artifacts in a video. The image capture device may include an image sensor and an image processor. The image sensor may be configured to capture a frame that includes a sinusoidal light waveform banding artifact. The image processor may be configured to detect a sinusoidal light waveform in the frame. The image processor may be configured to perform a sinusoidal regression. The image processor may be configured to obtain an inverted gain map. The image processor may be configured to apply the inverted gain map to the frame. The image processor may be configured to output the frame.

An aspect may include a method for detecting and repairing banding artifacts in a video. The method may include detecting a sinusoidal light waveform in a first frame of a plurality of frames. The method may include determining a frequency of the detected sinusoidal waveform. The method may include performing a sinusoidal regression to obtain a first inverted gain map for the first frame. The sinusoidal regression may be based on a timing of the first frame, the determined frequency of the detected sinusoidal light waveform, or both. The method may include applying the first inverted gain map to the first frame. The method may include applying a respective inverted gain map to each of the plurality of frames. Each respective gain map may be based on a timing of each respective frame of the plurality of frames, the determined frequency of the detected sinusoidal waveform, or both.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
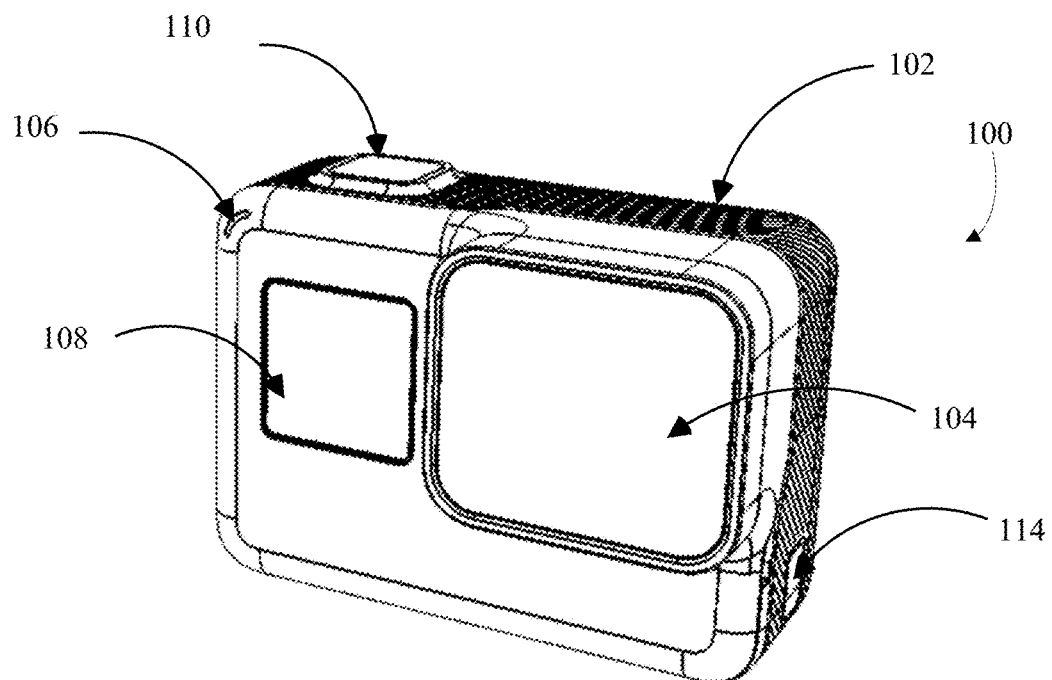
FIGS. 1A-D are isometric views of an example of an image capture device.
Figure 1B:
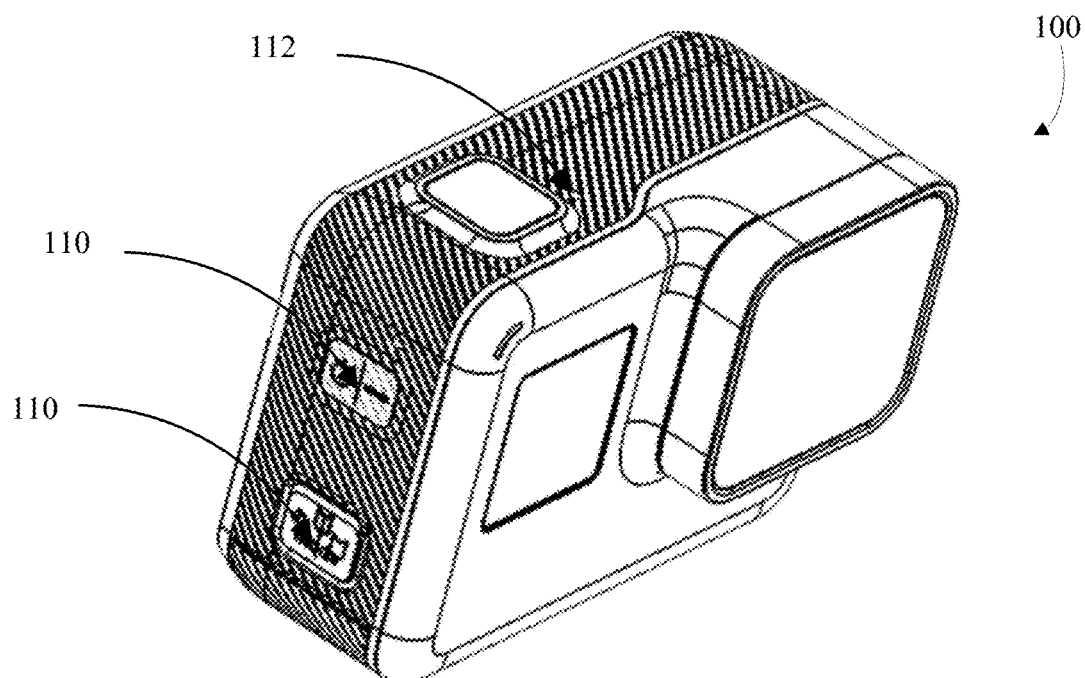
Figure 1C:
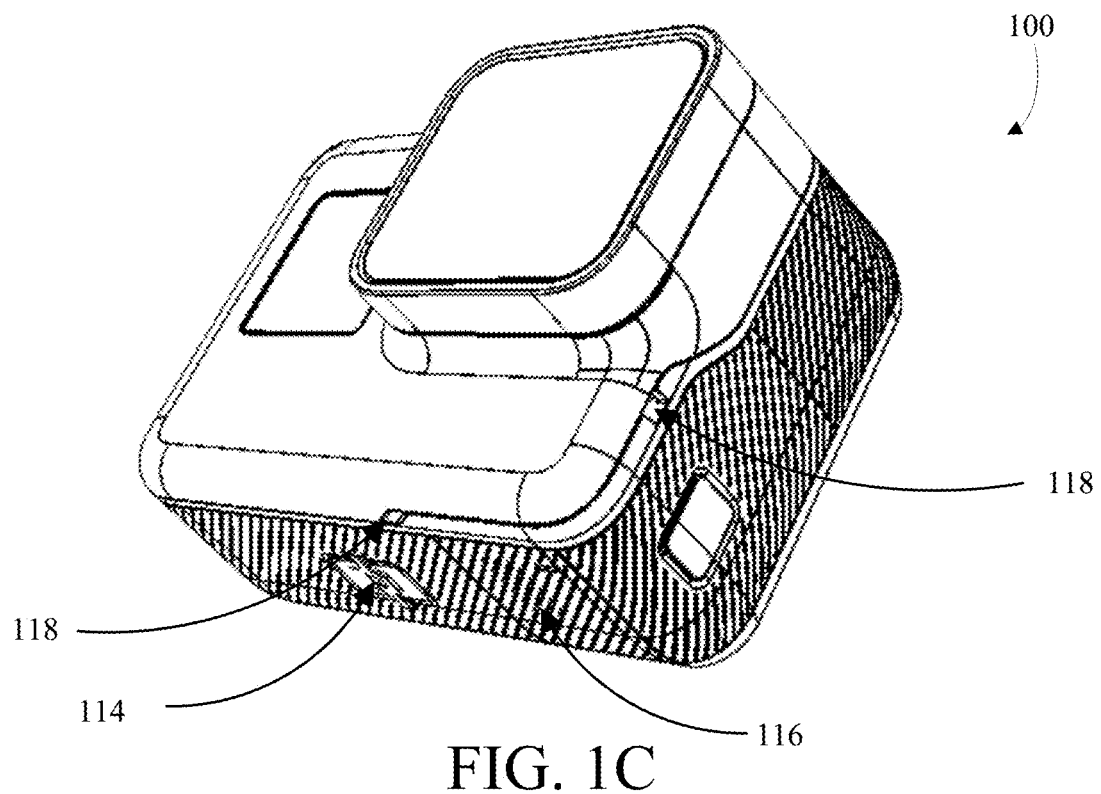
Figure 1D:
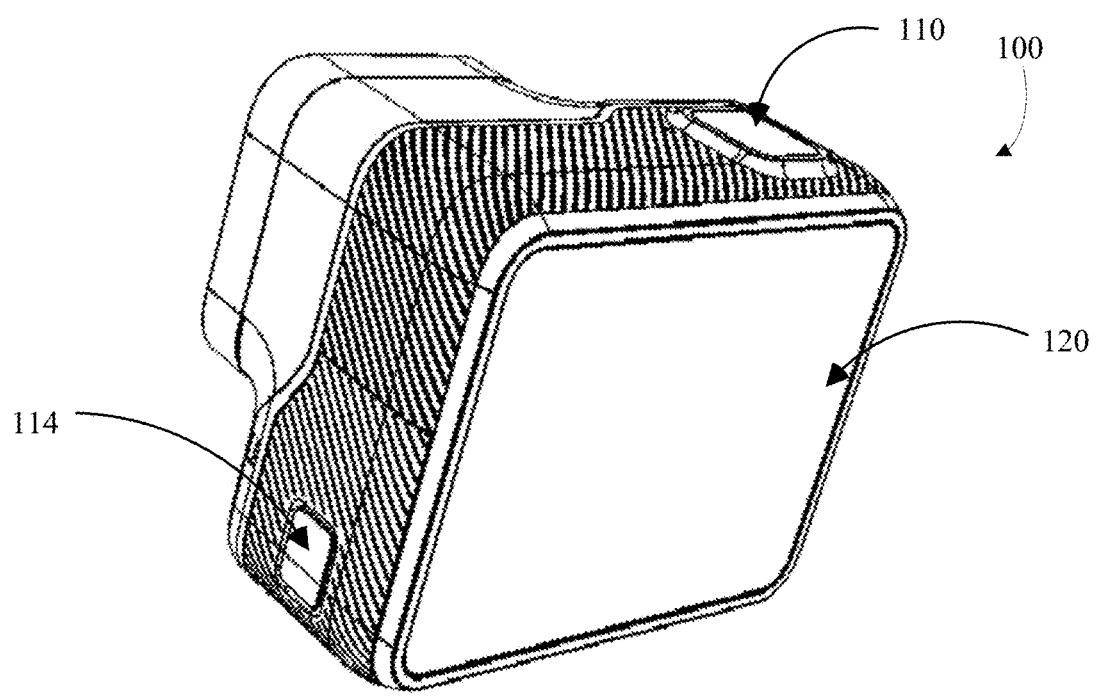

Typical methods to avoid flickering artifacts increase the shutter speed of an image capture device. However, when recording a high framerate video, such as 120 fps, 240 fps, or more, increasing the shutter speed of the image capture device is undesirable because the output timing of each image may be constrained by capping the maximum shutter time of the image capture device.

It would be desirable to correct the flickering artifacts, particularly when it is not possible to avoid them. This correction may include repairing the frame by applying a gain on the dark banding area of the image to keep the lighting stable over a frame-by-frame basis. The banding artifacts may be repaired based on a sinusoidal light waveform detection. The correction may include applying a gain corresponding to an inverted sinusoidal waveform on the final image.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
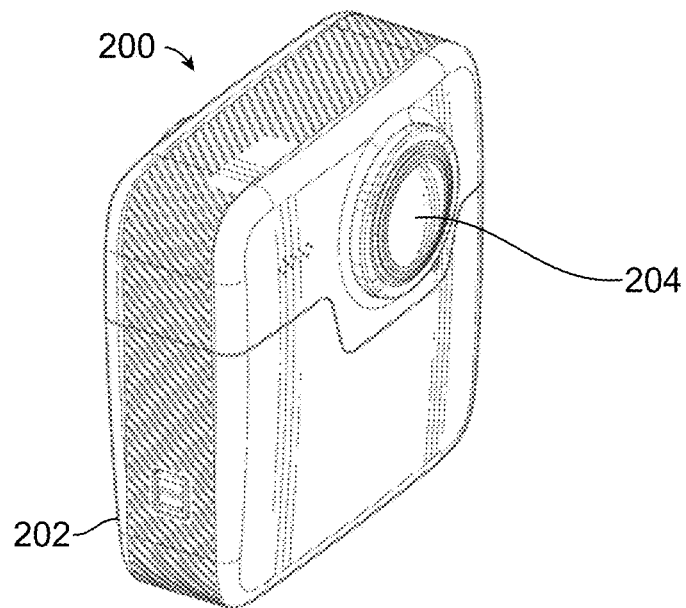
FIGS. 2A-B are isometric views of another example of an image capture device.
Figure 2B:
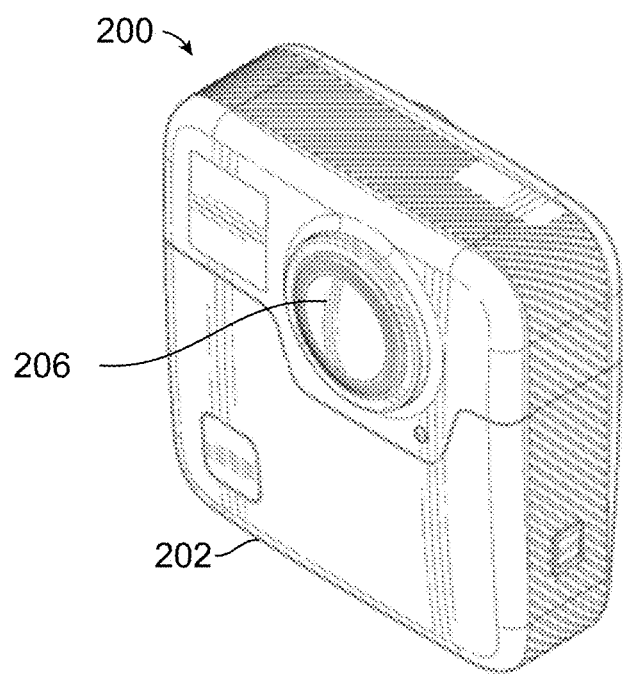

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
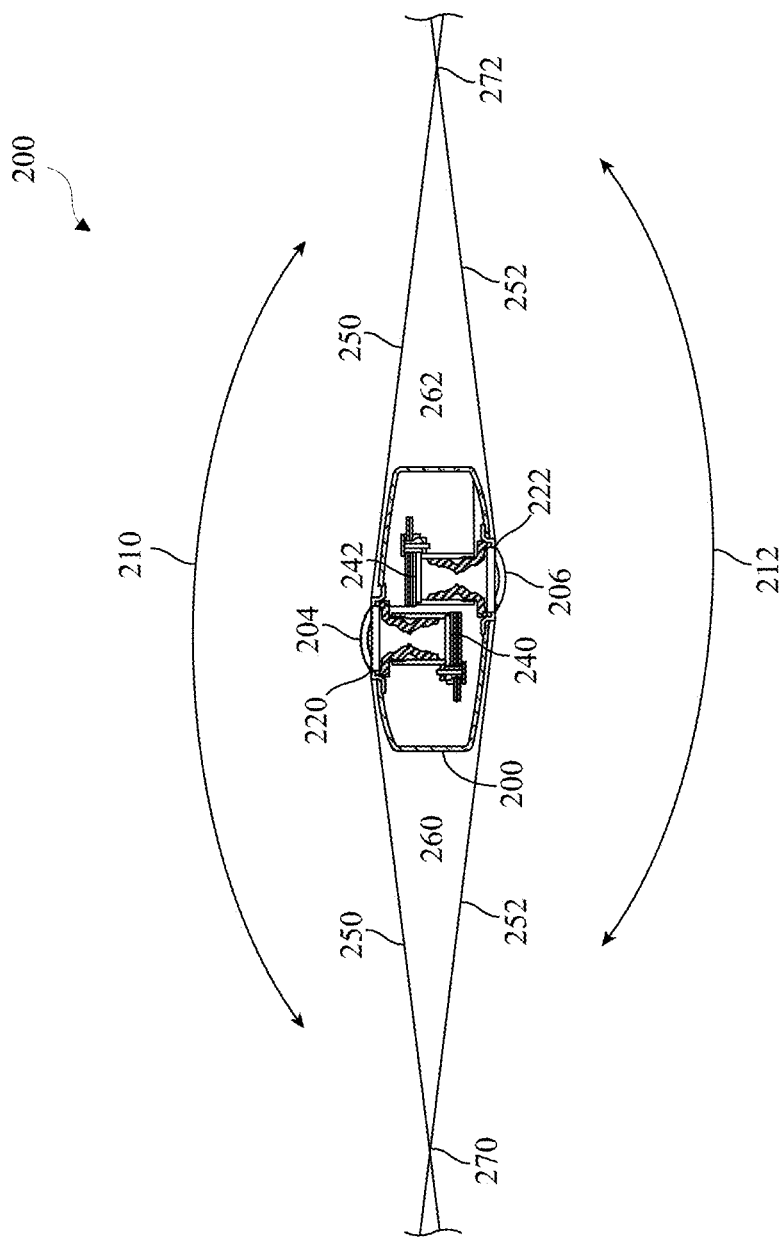
FIG. 2C is a cross-sectional view of the image capture device of FIGS. 2A-B.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figures 3A, 3B:
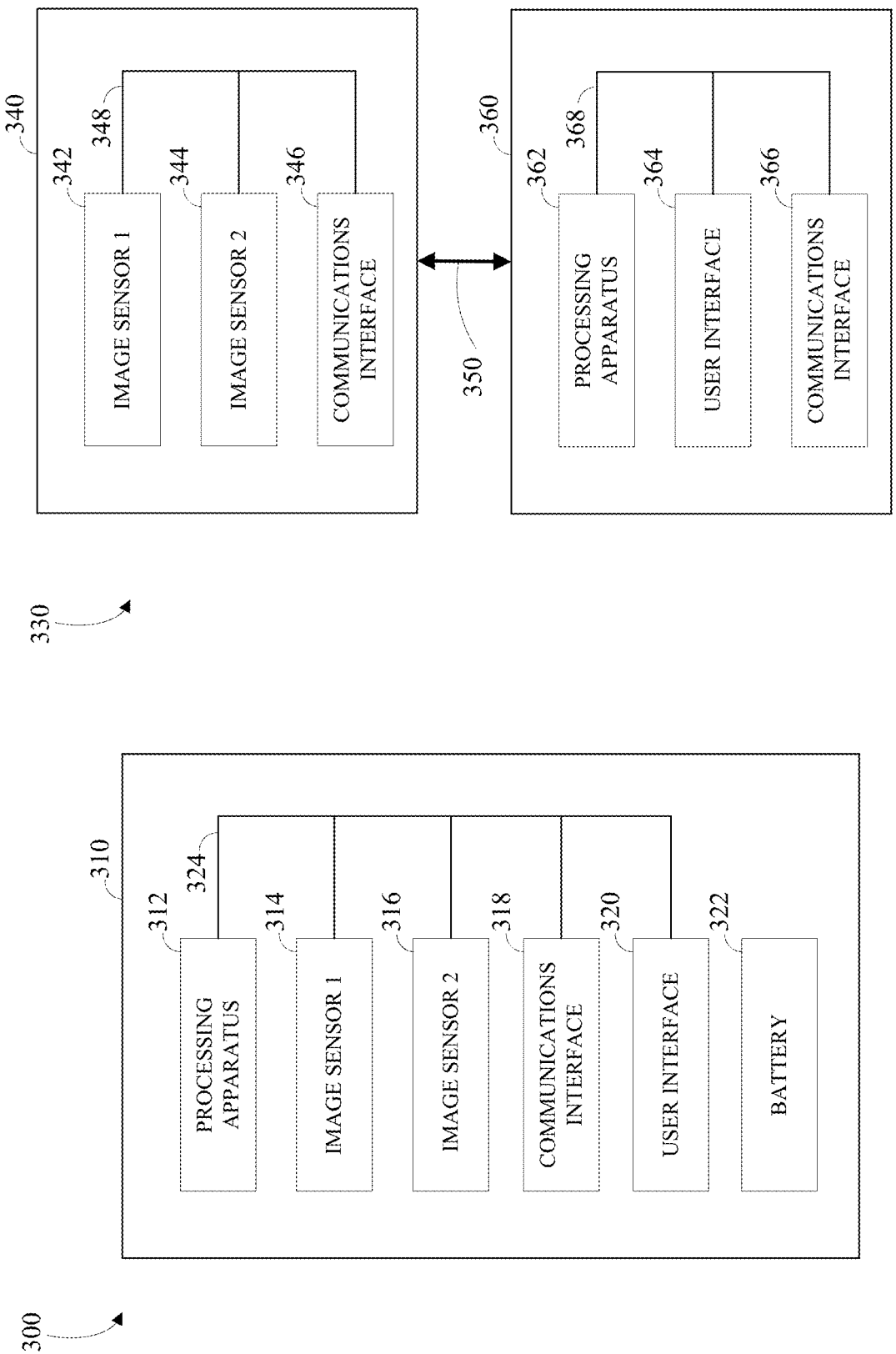
FIGS. 3A-B are block diagrams of examples of image capture systems.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may implement some or all of the methods described in this disclosure, such as the methods described in FIGS. 4-7.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

Figure 5:
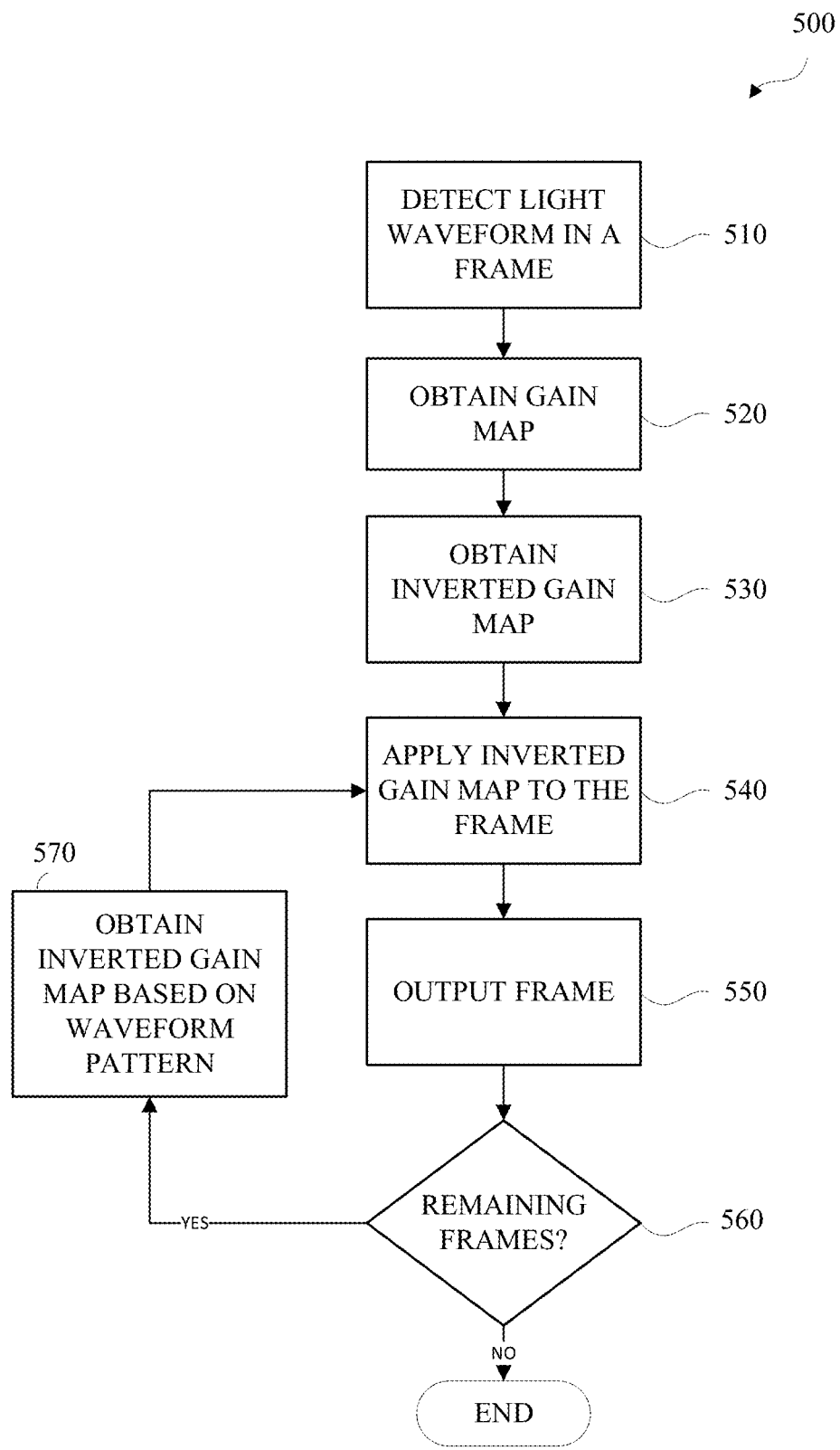
FIG. 5 is a flow diagram of an example of a method for obtaining an inverted gain map.
Figure 6:
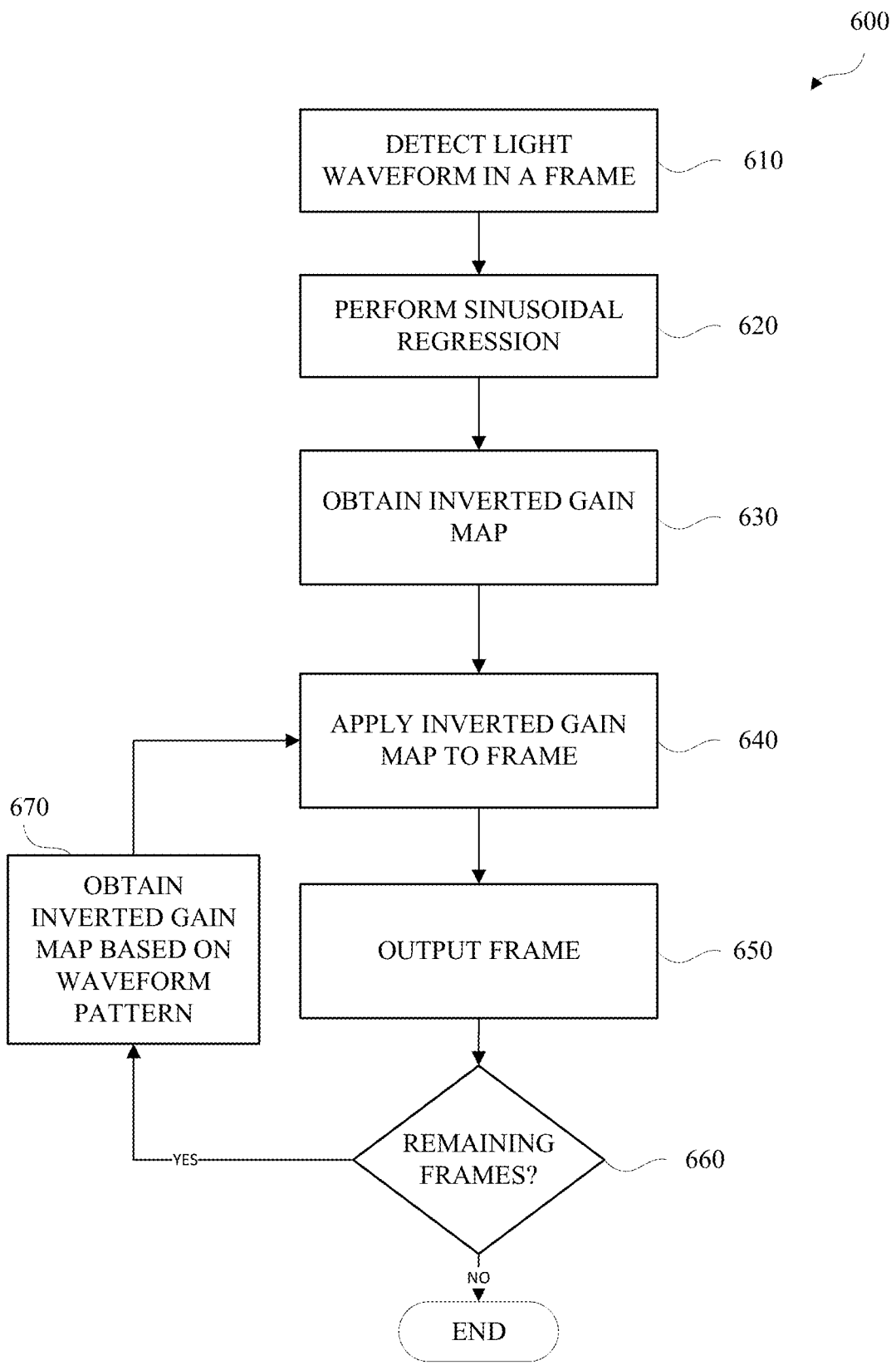
FIG. 6 is a flow diagram of another example of a method for obtaining an inverted gain map.
Figure 7:
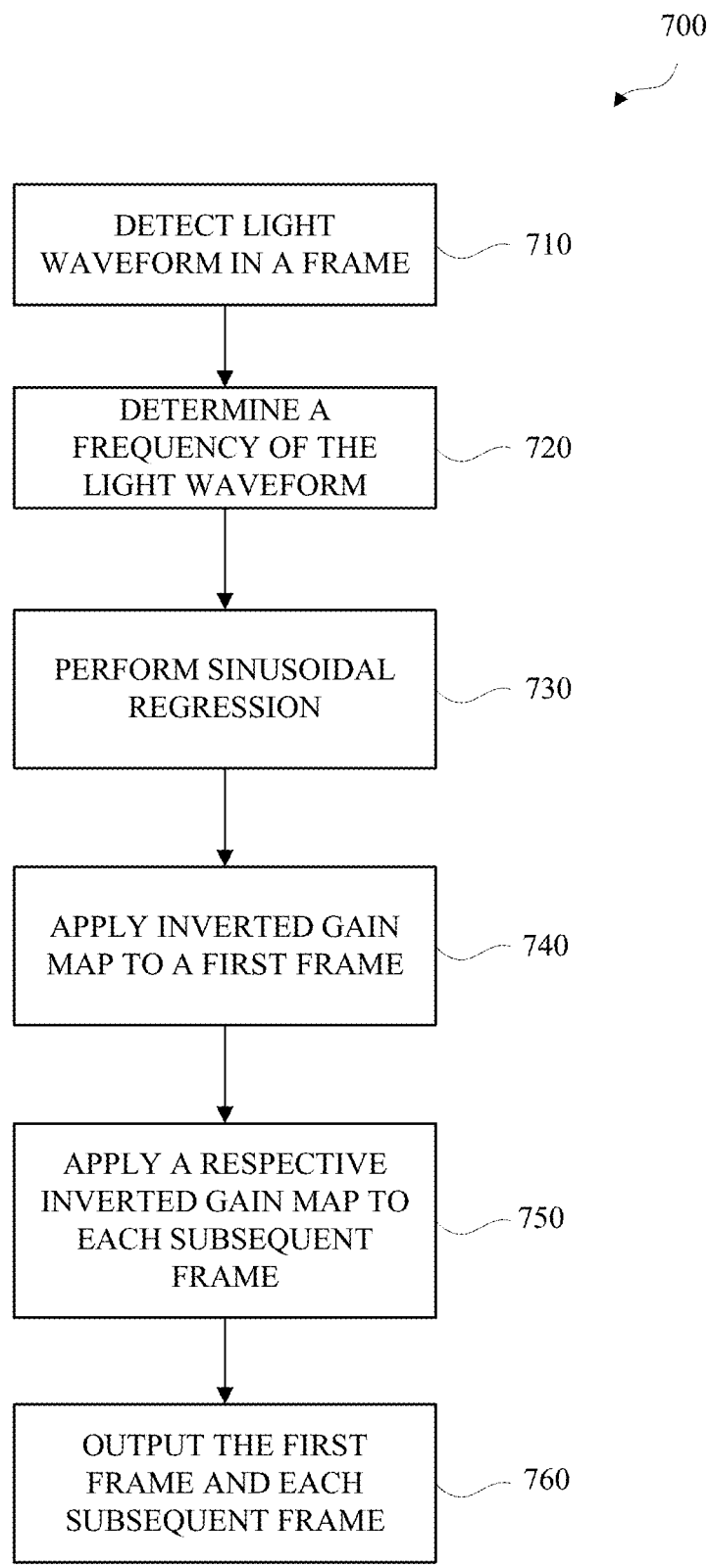
FIG. 7 is a flow diagram of another example of a method for obtaining an inverted gain map.

The image capture device 340 and/or the personal computing device 360 may be used to implement some or all of the methods described in this disclosure, such as the methods shown in FIGS. 5-7.

Figure 4:
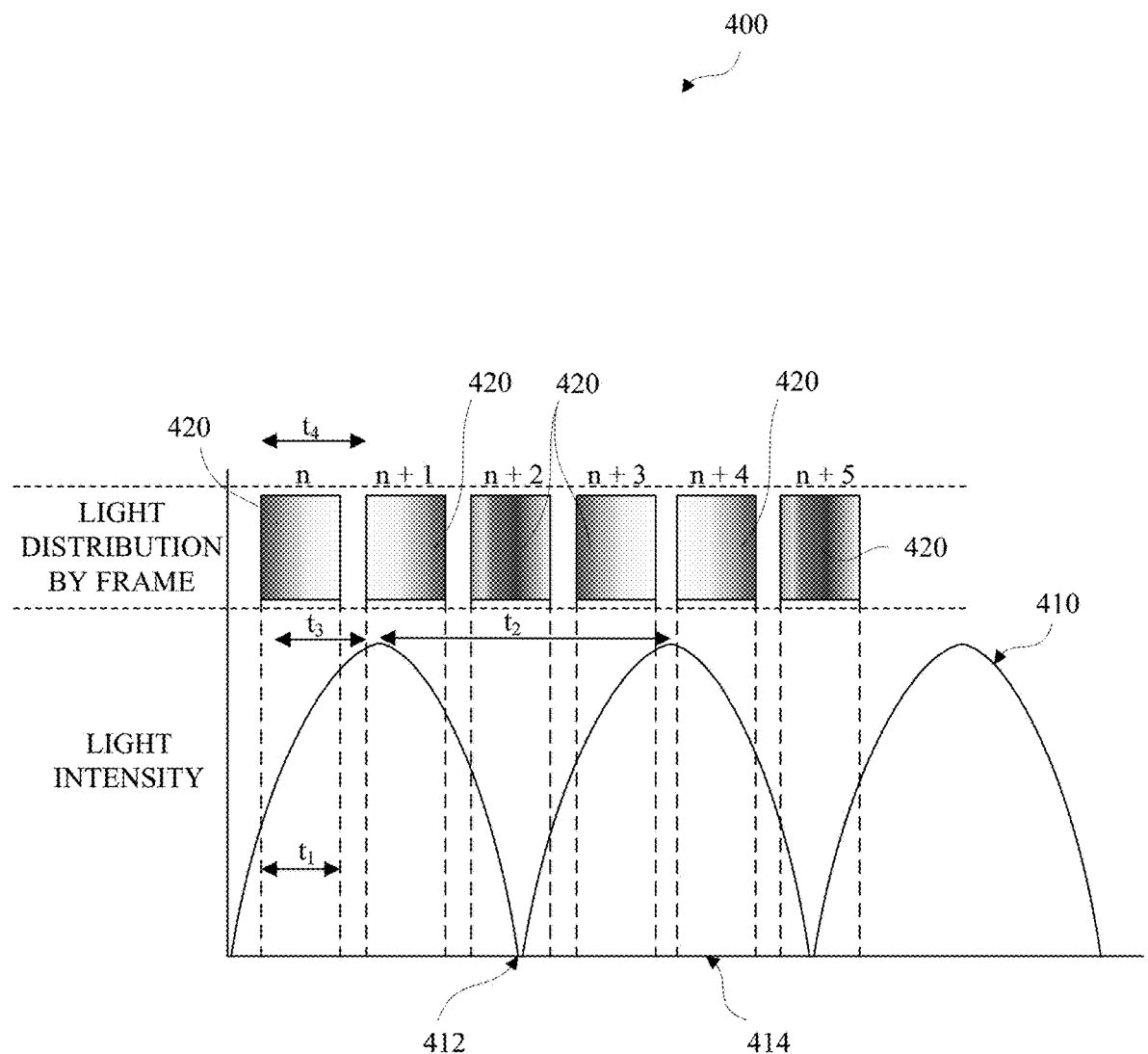
FIG. 4 is a diagram of a sinusoidal light distribution over multiple frames.

FIG. 4 is a diagram of a sinusoidal light distribution 400 over multiple frames. Referring to FIG. 4, it is shown that an AC power line has a sinusoidal waveform 410. The sinusoidal waveform 410 may oscillate at 50 Hz or 60 Hz depending on the region in the world. Due to the oscillating pattern of the sinusoidal waveform 410, there are periods of time with no light 412 and periods of time with light 414. The oscillation of the sinusoidal waveform 410 creates a pulsating light that humans cannot perceive as the oscillation is too high for a human eye to detect. An image sensor, however, will detect the pulsating light because of the rolling shutter technology used in the image sensor.

The detection of the pulsating light by the image sensor may depend on the shutter time configuration. For example, if the shutter time is below $$\frac{1}{(Freq \times 2)}$$

then banding artifacts 420 can start to be seen or perceived on the image. As shown in FIG. 4, the banding artifacts 420 shift from a first image n to a second image n+1, the second image n+1 to a third image n+2, and so forth. The shifting of the banding artifacts 420 from frame to frame cause a flicker in the video. The movement of the banding artifacts 420 may be based on the framerate.

The location of the banding artifacts 420 for each frame may be calculated based on the shutter time value $t_1$, the AC power line frequency $t_2$, and the rolling shutter value $t_3$. The shutter time value $t_1$ is the length of time when the image sensor of the image capture device is exposed to light. The AC power line frequency $t_2$ in much of North and South America is 60 Hz and in Europe, Africa and Asia, it is 50 Hz. The rolling shutter value $t_3$ is the time it takes for the image sensor to scan from one side of the frame to the opposite side of the frame. Referring to FIG. 4, $t_4$ is the time from the beginning of one frame to the beginning of the next adjacent frame, also referred to as the framerate frequency.

A typical method to avoid flickering artifacts is to increase the shutter speed above $$\frac{1}{(Freq \times 2)}.$$

In this example, the shutter speed time $t_3$ may receive at least one light pulse or more. However, when recording a high framerate video, such as 120 fps, 240 fps, or more, this type of correction cannot be applied due to the framerate since $t_3$ cannot exceed $t_4$. For example, in an area with 50 Hz AC power line frequency and recording at 200 fps, to avoid flickering, the shutter time should be more than $$\frac{1}{(50 \times 2)} = 10 \text{ ms}.$$

In this example, each image may be outputted every 5 ms, therefore the max shutter time may be capped at 5 ms.

In an embodiment, flickering may be corrected when it is not possible to avoid it. This correction may repair the frame by applying a gain on the dark banding area of the image to keep the lighting stable over a frame-by-frame basis. In an example, the banding artifacts 420 may be repaired based on an AC sinusoidal light waveform detection. The correction may include applying a gain corresponding to an inverted sinusoidal waveform on the final image.

FIG. 5 is a flow diagram of an example of a method 500 for obtaining an inverted gain map. The method 500 may be implemented in an image capture device such as image capture device 100 of FIGS. 1A-1D, image capture device 200 of FIGS. 2A-2C, image capture device 310 of FIG. 3A, and image capture device 340 of FIG. 3B. The method 500 may be performed in real-time or offline.

The method 500 includes detecting a sinusoidal light waveform 510 in a frame n. In an example, the frame n may include a banding artifact caused by the sinusoidal light waveform. The sinusoidal light waveform may be detected using image content data, luminance data, timing data from one or more sensors, gyroscope data, accelerometer data, infrared (IR) sensor data, or any combination thereof. The information used to detect the sinusoidal light waveform may be stored as metadata for later use, for example when removing the banding artifacts offline. In an example, a temporal subtraction may be performed where noise data from a previous frame (frame n−1) is subtracted from the current frame (frame n) to remove noise data. Removing the noise data allows the system to analyze the luminance data. The luminance data may be analyzed in conjunction with gyroscope data, accelerometer data, or both, to determine a sinusoidal light waveform pattern. The sinusoidal light waveform pattern may correspond to the frequency of the sinusoidal light waveform. The sinusoidal light waveform may be detected based on a timing of each frame. The timing of each frame may be based on a sensor configuration. For example, a sensor configuration may include a clock, a phase lock loop (PLL) divider, or both.

The method 500 includes obtaining a gain map 520 for the frame n. The gain map may be based on the determined sinusoidal light waveform pattern. The method 500 includes obtaining an inverted gain map 530 for the frame n. The inverted gain map may be based on the gain map. The inverted gain map corresponds to the inverted sinusoidal light waveform. The method 500 includes applying the inverted gain map 540 to the frame n to repair the banding artifact to obtain a repaired frame. The method 500 includes outputting the repaired frame 550. The method 500 includes determining whether there are any remaining frames 560 for analysis. If there are frames remaining to be analyzed, the method obtains 570 an inverted gain map based on the determined sinusoidal light wave pattern and applies the inverted gain map to the next frame n+1. In this way, the method may apply each subsequent inverted gain map that is based on a frequency of the detected sinusoidal light waveform to a respective subsequent frame.

FIG. 6 is a flow diagram of another example of a method 600 for obtaining an inverted gain map. The method 600 may be implemented in an image capture device such as image capture device 100 of FIGS. 1A-1D, image capture device 200 of FIGS. 2A-2C, image capture device 310 of FIG. 3A, and image capture device 340 of FIG. 3B. The method 600 may be performed in real-time or offline.

The method 600 includes detecting a sinusoidal light waveform 610 in a frame n. In an example, the frame n may include a banding artifact caused by the sinusoidal light waveform. The sinusoidal light waveform may be detected using image content data, luminance data, timing data from one or more sensors, gyroscope data, accelerometer data, IR sensor data, or any combination thereof. The information used to detect the sinusoidal light waveform may be stored as metadata for later use, for example when removing the banding artifacts offline. In an example, a temporal subtraction may be performed where noise data from a previous frame (frame n−1) is subtracted from the current frame (frame n) to remove noise data. Removing the noise data allows the system to analyze the luminance data. The luminance data may be analyzed in conjunction with gyroscope data, accelerometer data, or both, to determine a sinusoidal light waveform pattern. The sinusoidal light waveform pattern may correspond to the frequency of the sinusoidal light waveform. The sinusoidal light waveform may be detected based on a timing of each frame. The timing of each frame may be based on a sensor configuration. For example, a sensor configuration may include a clock, a PLL divider, or both.

The method 600 includes performing a sinusoidal regression 620. Performing the sinusoidal regression 620 may include matching the ambient lighting to a known light pulse frequency based on the regional area or location of the image capture device. For example, if the image capture device is performing an image capture in Europe where the known light pulse frequency is 50 Hz, the image capture device will use 50 Hz to perform the sinusoidal regression 620. If the image capture device is performing an image capture in North America where the known light pulse frequency is 60 Hz, the image capture device will use 60 Hz to perform the sinusoidal regression 620.

Performing the sinusoidal regression 620 may calculate an algorithm to obtain an inverted gain map 630 for a frame n. The inverted gain map may correspond to an inverted sinusoidal light waveform pattern that is based on the detected sinusoidal light waveform. The method 600 includes applying the inverted gain map 640 to the frame n to repair the banding artifact to obtain a repaired frame. The method 600 includes outputting the repaired frame 650. The method 600 includes determining whether there are any remaining frames 660 for analysis. If there are frames remaining to be analyzed, the method obtains 670 another inverted gain map based on the inverted sinusoidal light wave pattern and applies the inverted gain map to the next frame n+1. In this way, the method may apply each subsequent inverted gain map that is based on a frequency of the detected sinusoidal light waveform to a respective subsequent frame.

In an example, performing the sinusoidal regression 620 may include synchronizing a respective inverted gain map with each subsequent frame based on a timing of each subsequent frame and the determined frequency of the detected sinusoidal waveform. Applying the inverted gain map 640 may include applying each subsequent inverted gain map to a respective subsequent frame. Each subsequent inverted gain map may be based on the frequency of the detected sinusoidal light waveform.

FIG. 7 is a flow diagram of another example of a method 700 for obtaining an inverted gain map. The method 700 may be implemented in an image capture device such as image capture device 100 of FIGS. 1A-1D, image capture device 200 of FIGS. 2A-2C, image capture device 310 of FIG. 3A, and image capture device 340 of FIG. 3B. The method 700 may be performed in real-time or offline.

The method 700 includes detecting a sinusoidal light waveform 710 in a frame n. In an example, the frame n may include a banding artifact caused by the sinusoidal light waveform. The sinusoidal light waveform may be detected using image content data, luminance data, timing data from one or more sensors, gyroscope data, accelerometer data, IR sensor data, or any combination thereof. The information used to detect the sinusoidal light waveform may be stored as metadata for later use, for example when removing the banding artifacts offline. In an example, a temporal subtraction may be performed where noise data from a previous frame (frame n−1) is subtracted from the current frame (frame n) to remove noise data. Removing the noise data allows the system to analyze the luminance data. The luminance data may be analyzed in conjunction with gyroscope data, accelerometer data, or both, to determine a sinusoidal light waveform pattern. The sinusoidal light waveform pattern may correspond to the frequency of the sinusoidal light waveform. The sinusoidal light waveform may be detected based on a timing of each frame. The timing of each frame may be based on a sensor configuration. For example, a sensor configuration may include a clock, a PLL divider, or both.

The method 700 includes determining 720 a frequency of the detected sinusoidal waveform. The determination of the frequency may be based on the regional area or location of the image capture device, the sensor data used to detect the sinusoidal light waveform, or both. The method 700 includes performing a sinusoidal regression 730. Performing the sinusoidal regression 730 may include matching the ambient lighting to a known light pulse frequency based on the regional area or location of the image capture device. For example, if the image capture device is performing an image capture in Europe where the known light pulse frequency is 50 Hz, the image capture device will use 50 Hz to perform the sinusoidal regression 730. If the image capture device is performing an image capture in North America where the known light pulse frequency is 60 Hz, the image capture device will use 60 Hz to perform the sinusoidal regression 730.

Performing the sinusoidal regression 730 may calculate an algorithm to obtain an inverted gain map for a frame n. The inverted gain map may correspond to an inverted sinusoidal light waveform pattern that is based on the detected sinusoidal light waveform. The sinusoidal regression may be based on a timing of the frame n and the determined frequency of the detected sinusoidal light waveform. The method 700 includes applying the inverted gain map 740 to the frame n to repair the banding artifact to obtain a repaired frame n. The method 700 may include synchronizing a respective inverted gain map with each subsequent frame based on a timing of each subsequent frame and the determined frequency of the detected sinusoidal waveform and applying 750 each subsequent inverted gain map to a respective subsequent frame. Each subsequent inverted gain map may be based on the frequency of the detected sinusoidal light waveform. The method 700 includes outputting the repaired frame n and each subsequent repaired frame 760.

Figure 8:
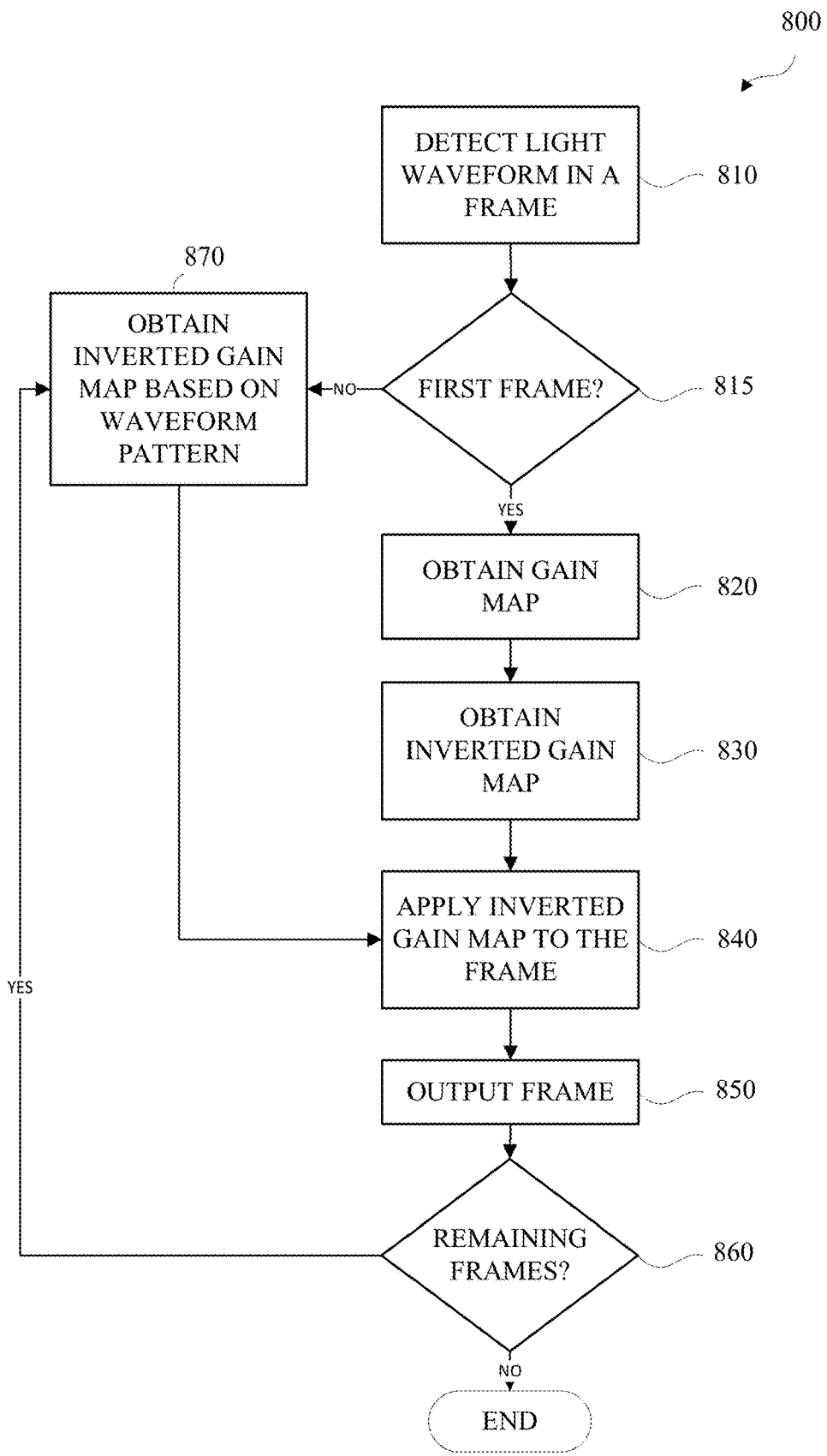
FIG. 8 is a flow diagram of another example of a method for obtaining an inverted gain map.

FIG. 8 is a flow diagram of another example of a method 800 for obtaining an inverted gain map. The method 800 may be implemented in an image capture device such as image capture device 100 of FIGS. 1A-1D, image capture device 200 of FIGS. 2A-2C, image capture device 310 of FIG. 3A, and image capture device 340 of FIG. 3B. The method 800 may be performed in real-time or offline.

The method 800 includes detecting a sinusoidal light waveform 810 in a frame n. In an example, the frame n may include a banding artifact caused by the sinusoidal light waveform. The sinusoidal light waveform may be detected using image content data, luminance data, timing data from one or more sensors, gyroscope data, accelerometer data, IR sensor data, or any combination thereof. The information used to detect the sinusoidal light waveform may be stored as metadata for later use, for example when removing the banding artifacts offline. In an example, a temporal subtraction may be performed where noise data from a previous frame (frame n−1) is subtracted from the current frame (frame n) to remove noise data. Removing the noise data allows the system to analyze the luminance data. The luminance data may be analyzed in conjunction with gyroscope data, accelerometer data, or both, to determine a sinusoidal light waveform pattern. The sinusoidal light waveform pattern may correspond to the frequency of the sinusoidal light waveform. The sinusoidal light waveform may be detected based on a timing of each frame. The timing of each frame may be based on a sensor configuration. For example, a sensor configuration may include a clock, a phase lock loop (PLL) divider, or both.

The method 800 includes determining 815 whether the frame n is the first frame of a plurality of frames. If it is determined that the frame n is the first frame, the method 800 continues by obtaining a gain map 820 for the frame n. The gain map may be based on the determined sinusoidal light waveform pattern. The method 800 includes obtaining an inverted gain map 830 for the frame n. The inverted gain map may be based on the gain map. The inverted gain map corresponds to the inverted sinusoidal light waveform. The method 800 includes applying the inverted gain map 840 to the frame n to repair the banding artifact to obtain a repaired frame. The method 800 includes outputting the repaired frame 850. The method 800 includes determining whether there are any remaining frames 860 for analysis. If there are frames remaining to be analyzed, the method obtains 870 an inverted gain map based on the determined sinusoidal light wave pattern and applies 840 the inverted gain map to the next frame n+1. In this way, the method may apply each subsequent inverted gain map that is based on a frequency of the detected sinusoidal light waveform to a respective subsequent frame. If it is determined at 815 that the frame n is not the first frame, the method 800 continues to obtain 870 an inverted gain map based on the determined sinusoidal light wave pattern and applies 840 the inverted gain map to the next frame n+1.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   detecting a sinusoidal light waveform in a frame that includes a banding artifact;
   obtaining a gain map based on the sinusoidal light waveform;
   obtaining an inverted gain map based on the gain map via a sinusoidal regression based on a timing of the frame and a frequency of the sinusoidal light waveform;
   applying the inverted gain map to the frame to repair the banding artifact to obtain a repaired frame; and
   outputting the repaired frame.

2. The method of claim 1, further comprising:
   applying a subsequent inverted gain map to a subsequent frame, wherein the subsequent inverted gain map is based on the frequency of the sinusoidal light waveform.

3. The method of claim 1, wherein the sinusoidal light waveform is detected based on image content data.

4. The method of claim 1, wherein the sinusoidal light waveform is detected based on luminance data of the frame.

5. The method of claim 1, wherein the sinusoidal light waveform is detected based on a timing of each frame based on a sensor configuration.

6. The method of claim 5, wherein the sensor configuration includes a clock.

7. The method of claim 5, wherein the sensor configuration includes a PLL divider.

8. The method of claim 1 further comprising:
   performing a temporal subtraction to remove noise data from the frame.

9. The method of claim 1, wherein the sinusoidal light waveform is detected based on infrared (IR) sensor data.

10. An image capture device comprising:
    an image sensor configured to capture a frame that includes a sinusoidal light waveform banding artifact; and
    an image processor configured to:
    detect a sinusoidal light waveform in the frame;
    perform a sinusoidal regression based on a timing of the frame and a frequency of the sinusoidal light waveform;
    obtain an inverted gain map;
    apply the inverted gain map to the frame; and
    output the frame.

11. The image capture device of claim 10, wherein the image processor is further configured to match an ambient light to a known light pulse frequency based on a location of the image capture device.

12. The image capture device of claim 10, wherein the image processor is further configured to apply a subsequent inverted gain map to a subsequent frame, wherein the subsequent inverted gain map is based on the frequency of the sinusoidal light waveform.

13. The image capture device of claim 10, wherein the frequency is 50 Hz or 60 Hz.

14. The image capture device of claim 10, wherein the image processor is configured to perform the sinusoidal regression to synchronize a respective inverted gain map with each subsequent frame based on a timing of each subsequent frame and the frequency of the sinusoidal light waveform.

15. The image capture device of claim 10, wherein the image processor is configured to apply each respective inverted gain map to a respective subsequent frame.

16. A method comprising:
- detecting a sinusoidal light waveform in a first frame of a plurality of frames;
- determining a frequency of the sinusoidal light waveform;
- performing a sinusoidal regression to obtain a first inverted gain map for the first frame, wherein the sinusoidal regression is based on a timing of the first frame and the frequency of the sinusoidal light waveform;
- applying the first inverted gain map to the first frame; and
- applying a respective inverted gain map to each of the plurality of frames, wherein each respective gain map is based on a timing of each respective frame of the plurality of frames and the frequency of the sinusoidal light waveform.

17. The method of claim 16, wherein the sinusoidal light waveform is detected based on luminance data of the first frame.

18. The method of claim 16 further comprising:
- performing a temporal subtraction to remove noise data from the first frame.

19. The method of claim 16, wherein the sinusoidal light waveform is detected based on infrared (IR) sensor data.

20. The method of claim 16, wherein the frequency is 50 Hz or 60 Hz.

* * * * *